United States Patent
Kurabayashi

(10) Patent No.: US 10,350,493 B2
(45) Date of Patent: Jul. 16, 2019

(54) INFORMATION PROCESSING PROGRAM AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 201 days.

(21) Appl. No.: 15/626,901

(22) Filed: Jun. 19, 2017

(65) Prior Publication Data

US 2017/0282070 A1 Oct. 5, 2017

Related U.S. Application Data

(63) Continuation of application No. PCT/JP2015/080687, filed on Oct. 30, 2015.

(30) Foreign Application Priority Data

Dec. 19, 2014 (JP) ................ 2014-256987

(51) Int. Cl.
*A63F 13/55* (2014.01)
*A63F 13/426* (2014.01)
(Continued)

(52) U.S. Cl.
CPC ........ *A63F 13/426* (2014.09); *A63F 13/2145* (2014.09); *A63F 13/55* (2014.09);
(Continued)

(58) Field of Classification Search
USPC ......................................... 463/31
See application file for complete search history.

(56) References Cited

U.S. PATENT DOCUMENTS 8,379,098 B2   2/2013   Rottler et al.
9,009,621 B2   4/2015   Ahn et al.
(Continued)

FOREIGN PATENT DOCUMENTS

JP   2007-222411 A   9/2007
JP   2011-076588 A   4/2011
JP   2011-182929 A   9/2011

OTHER PUBLICATIONS

Notice of Reasons for Rejection issued in JP Application No. 2014-256987, dated May 12, 2015 (1 page).
(Continued)

*Primary Examiner* — Pierre E Elisca
(74) *Attorney, Agent, or Firm* — Osha Liang LLP

(57) ABSTRACT

The purpose of the present invention is to provide a position-independent user interface that can realize a large variety of commands and high responsiveness as perceived by a user. A control unit 30 functions when a game involving a plurality of kinds of actions corresponding to predetermined commands represented by predetermined sequences of input events is executed. An input detecting unit 31 detects an input event based on an operation of bringing something into contact with or in proximity to a touchscreen 40. An estimating unit 32 decides, as an estimated command, a command that is estimated as being an input command among the plurality of kinds of commands on the basis of a history of detection results in the input detecting unit 31. A display control unit 33 executes control for displaying an image related to the estimated command on the touchscreen 40. A command determining unit 34 determines the estimated command as being the input command in a case where the estimated command satisfies a predetermined condition. An action executing unit 35 executes the action corresponding to the determined input command.

6 Claims, 6 Drawing Sheets

(51) Int. Cl.
  *G06F 3/0488*  (2013.01)
  *G06F 3/0484*  (2013.01)
  *A63F 13/2145*  (2014.01)
  *A63F 13/822*  (2014.01)
  *A63F 13/92*  (2014.01)

(52) U.S. Cl.
  CPC ............ *A63F 13/822* (2014.09); *A63F 13/92* (2014.09); *G06F 3/0484* (2013.01); *G06F 3/0488* (2013.01); *A63F 2300/6054* (2013.01)

(56) References Cited

U.S. PATENT DOCUMENTS

| | | |
|---|---|---|
| 2009/0054156 A1 | 2/2009 | Mori |
| 2011/0077083 A1* | 3/2011 | Ahn .................... G06F 3/04845 463/37 |
| 2017/0168566 A1* | 6/2017 | Osterhout ............... G06F 3/012 |

OTHER PUBLICATIONS

International Search Report issued in Application No. PCT/JP2015/080687, dated Dec. 1, 2015 (1 page).

Written Opinion issued in Application No. PCT/JP2015/080687, dated Dec. 1, 2015 (3 pages).

* cited by examiner

INFORMATION PROCESSING PROGRAM AND INFORMATION PROCESSING METHOD

TECHNICAL FIELD

The present invention relates to information processing programs and information processing methods.

BACKGROUND ART

In portable devices, touchscreens serving as both display devices and input devices have been extensively used since before. As input interfaces employing touchscreens, fixed button-based user interfaces, shown in FIG. 9, and position-independent user interfaces, shown in FIG. 10, exist.

In fixed button-based user interfaces, as shown in FIG. 9, various specific indications 501 to 510, including a button and a cross key for input and other elements related to input events, are displayed in a superimposed manner on a main image (an image of a person and scene). Furthermore, input events are detected only in cases where a player's finger touches limited places, such as the specific indication 501 representing a button and the specific indication 502 representing a cross key.

On the other hand, in position-independent user interfaces, as shown in FIG. 10, the specific indications 501 to 510 do not exist, and input events are detected when a player's finger 601 touches arbitrary positions on the screen (touchscreen), while a main image (an image of a person and scene) is displayed without being hidden.

Compared with fixed button-based user interfaces, with which it is necessary to constantly display buttons and a cross key on the screen, position-independent user interfaces, with which touch operations are allowed at arbitrary positions on the screen (touchscreen), are particularly effective when playing games on portable terminals such as smartphones, for which the screen sizes are limited.

However, in games employing position-independent user interfaces, it is not possible to uniquely determine an action from a single touch operation by a user. For example, at the moment when a user touches a part of a screen, it is difficult to uniquely determine whether the touch is a single tap operation for selecting an item or character displayed at that position, the start of successive tap operations on the screen, or the start of a swipe operation for designating a direction. Thus, in order to enable unique determination of all operations, it has been the case with conventional position-independent user interfaces to adopt a method in which the possible kinds of user inputs are considerably limited, a method in which areas that can be tapped are broadly segmented, a method in which what is input is fed back on the screen in real time so that the user can immediately recognize incorrect inputs, and so on (e.g., see Patent Literature 1).

Furthermore, in position-independent user interfaces in fields other than games, gesture input is well known. For example, Patent Literature 2 discloses a user interface having a function for recognizing gestures made by combining graphics such as circles and rectangles, symbols such as check marks and question marks, and characters such as letters of the alphabet and a function for allowing users to individually customize gestures.

Patent Literature 1: Japanese Unexamined Patent Application, Publication No. 2011-076588

Patent Literature 2: Specification of U.S. Pat. No. 8,379,098

DISCLOSURE OF THE INVENTION

Problems to be Solved by the Invention

With the conventional technologies including those of Patent Literatures 1 and 2, however, it is not possible to immediately identify a command represented by a sequence of input events. Thus, the conventional technologies are unsuitable as user interfaces for action games or highly real-time RPGs. Accordingly, in games directed to portable devices, such as smartphones, there is a demand for realizing a position-independent user interface that can realize a large variety of commands and high responsiveness as perceived by a user.

The present invention has been made in view of this situation, and it is an object thereof to provide a position-independent user interface that can realize a large variety of commands and high responsiveness as perceived by a user.

Means for Solving the Problems

In order to achieve the above object, an information processing program according to one aspect of the present invention causes a computer that executes a game involving a plurality of kinds of actions corresponding to predetermined commands represented by predetermined sequences of input events to execute control processing including: an input detecting step of detecting an input event based on an operation of bringing something into contact with or in proximity to a display medium; an estimating step of deciding, as an estimated command, a command that is estimated as being an input command among the plurality of kinds of commands on the basis of a history of detection results in the input detecting step; a display control step of executing control for displaying an image related to the estimated command on the display medium; a command determining step of determining the estimated command as being the input command in a case where the estimated command satisfies a predetermined condition; and an action executing step of executing the action corresponding to the determined input command.

As described above, before an input command is determined, an estimated command is decided on the basis of a history of input events, and an image related to the estimated command is displayed on the display medium. Then, an estimated command satisfying the predetermined condition is determined as being the input command, and the action corresponding to the input command is executed. This makes it easy to provide a large variety of commands and to realize high responsiveness to commands as perceived by a user (e.g., by display switching of images for estimated commands). Accordingly, it becomes possible to provide a position-independent user interface that can realize a large variety of commands and high responsiveness as perceived by a user.

In an information processing program according to another aspect of the present invention, the estimating step includes: a probability calculating step of calculating individual input probabilities of the plurality of kinds of commands on the basis of the history of the input events; and an estimated-command deciding step of deciding, as the estimated command, a command having the highest input probability.

Since this makes it possible to readily and immediately identify an estimated command even if the kinds of commands increase, it becomes possible, in a more appropriate fashion, to realize a large variety of commands and high responsiveness as perceived by a user.

In an information processing program according to yet another aspect of the present invention, the display control step includes a step of executing control for: displaying a first image corresponding to a first estimated command on the display medium in a case where the first estimated command is decided in the estimating step; and stopping the display of the first image and displaying a second image corresponding to a second estimated command on the display medium in a case where the second estimated command is then decided in the estimating step before the input command is determined in the command determining step.

Since this makes it possible to present a player, in real time and appropriately, with what the estimated command is, it becomes possible, in a more appropriate fashion, to realize a large variety of commands and high responsiveness as perceived by a user.

In an information processing program according to yet another aspect of the present invention, a period from the detection of the input event to the execution of the action is specified in advance, the first image and the second image are moving images having lengths equal to the period, and in a case where switching from the first estimated command to the second estimated command occurs at a certain timing during the period, the display control step includes a step of executing control for starting display of the second image with a display start point of the second image set at the certain timing during the period.

Accordingly, during the period before the execution of an action, moving images for estimated commands are displayed without causing a sense of unnaturalness, and when the moving images for estimated commands are finished, an action is executed by considering the command corresponding to the last moving image as the input command. Thus, a user can play the game without experiencing a sense of unnaturalness.

In an information processing program according to yet another aspect of the present invention, the input detecting step includes a step of generating a matrix constituted by using detection timings of input events as elements of one of rows and columns and using detection units of input events on the display medium as elements of the other of rows and columns, the matrix having detection results at the individual detection timings and for the individual detection units as individual element values, and the estimating step includes a step of deciding the estimated command by using the matrix.

Since this makes it possible to use a matrix-based generic algorithm as a method of deciding an estimated command, extendability is increased, and implementation becomes easy.

An information processing method according to one aspect of the present invention is an information processing method corresponding to the information processing program according to the above-described one aspect of the present invention.

Effects of the Invention

The present invention makes it possible to provide a position-independent user interface that can realize a large variety of commands and high responsiveness as perceived by a user.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images." Furthermore, "moving images" should be construed to include images that are displayed individually through the following first to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
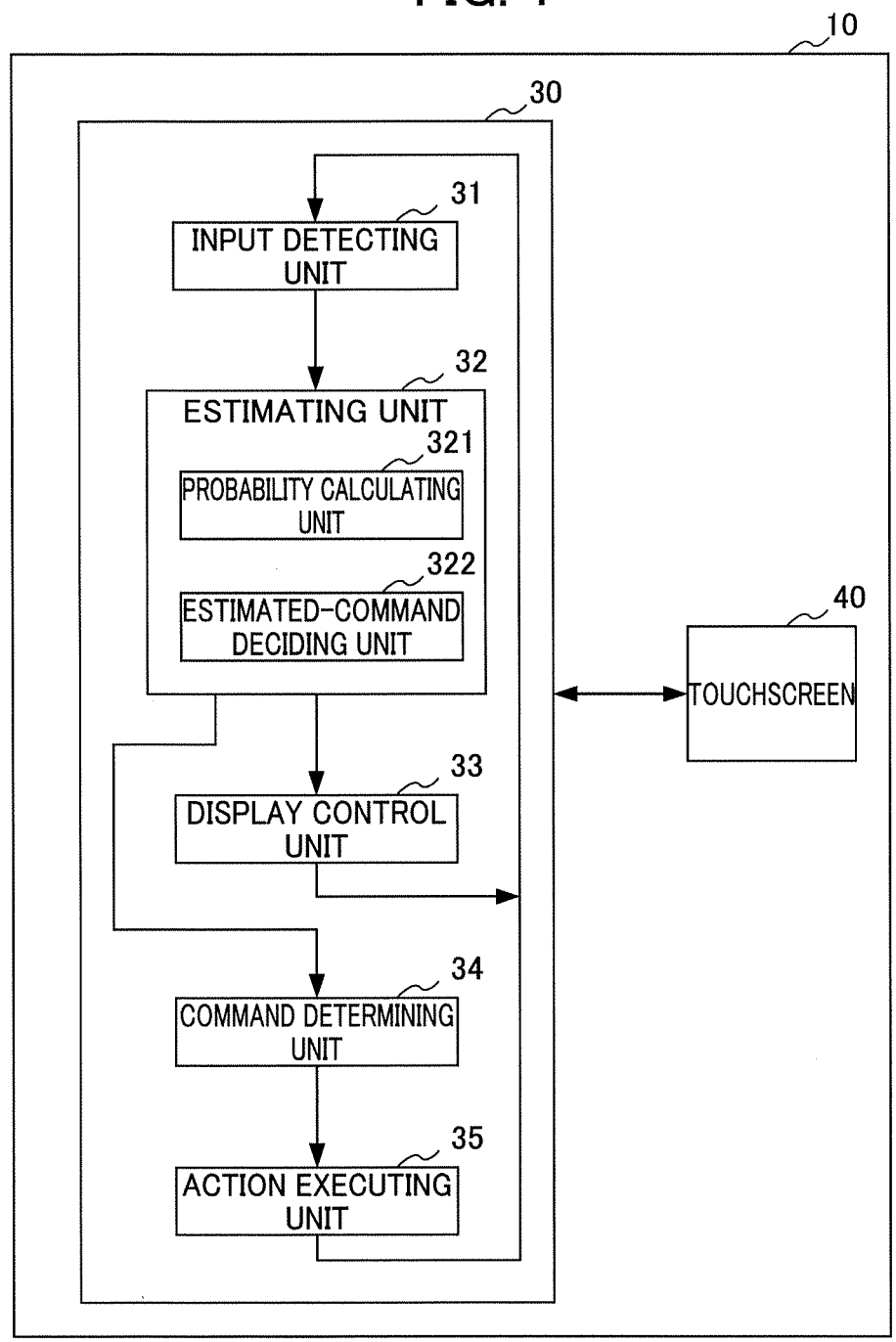
FIG. 1 is a functional block diagram showing the functional configuration of an information processing apparatus according to an embodiment of the present invention.

FIG. 1 shows the configuration of an information processing apparatus 10 according to an embodiment of the present invention. The information processing apparatus 10 in this embodiment is applied to a computer and peripheral devices thereof. The individual units in this embodiment are implemented by hardware provided in the computer and the peripheral devices thereof, as well as by software for controlling the hardware.

The hardware includes a CPU (Central Processing Unit) that serves as a control unit, and also includes a storage unit, a communication unit, a display unit, and an input unit.

Examples of the storage unit include a memory (RAM: Random Access Memory, ROM: Read Only Memory, etc.), an HDD (Hard Disk Drive), and an optical disk (CD: Compact Disk, DVD: Digital Versatile Disk, etc.) drive. Examples of the communication unit include various types of wired and wireless interface devices. Examples of the display unit include various types of displays, such as a liquid crystal display. Examples of the input unit include a keyboard and a pointing device (a mouse, a trackball, etc.).

The information processing apparatus 10 in this embodiment is provided with a touchscreen 40 as a display medium that serves as both an input unit and a display unit. For example, the input unit of the touchscreen 40 is constituted of capacitive or resistive position input sensors that are stacked in the display area of the display unit, which detect the coordinates of a position at which a touch operation is performed. The touch operation here refers to bringing something (a user's finger, a stylus, etc.) into contact with or in proximity to the touchscreen 40 (precisely the input unit thereof) serving as a display medium. Hereinafter, a position at which a touch operation is performed will be referred to as a "touched position," and the coordinates of a touched position will be referred to as "touched coordinates."

Furthermore, the software includes computer programs and data for controlling the hardware. The computer programs and data are stored in the storage unit and are executed or referred to as appropriate by the control unit. Furthermore, the computer programs and data can be distributed either via a communication circuit or as recorded on a computer-readable medium, such as a CD-ROM.

In order to execute various operations through cooperation between the hardware and software described above, the information processing apparatus 10 in this embodiment has the functional configuration shown in FIG. 1.

The information processing apparatus 10 includes a control unit 30 and a touchscreen 40. The control unit 30 includes an input detecting unit 31, an estimating unit 32, a display control unit 33, a command determining unit 34, and an action executing unit 35.

The input detecting unit 31 detects an input event based on a touch operation on the touchscreen 40 (input unit).

The estimating unit 32 decides, as an estimated command, a command that is estimated as being an input command among a plurality of kinds of commands on the basis of a history of detection results in the input detecting unit 31. That is, an estimated command refers to a command that is estimated as being an input command, and an input command refers to a command that is determined by the command determining unit 34 described later. Specifically, the estimating unit 32 includes a probability calculating unit 321 and an estimated-command deciding unit 322. The probability calculating unit 321 calculates individual input probabilities of a plurality of kinds of commands on the basis of a history of input events. An input probability here refers to the probability that a certain command can be an input command. The estimated-command deciding unit 322 decides a command having the highest calculated input probability as an estimated command.

The display control unit 33 executes control for displaying an image related to an estimated command on a display medium (e.g., the display unit of the touchscreen 40). Specifically, for example, in a case where a first estimated command is decided in the estimating unit 32, the display control unit 33 displays a first image corresponding to the first estimated command on the display medium. In a case where a second estimated command is then decided in the estimating unit 32 before an input command is determined in the command determining unit 34, the display control unit 33 stops the display of the first image and displays a second image corresponding to the second estimated command on the display medium. Details and a specific example of such display control by the display control unit 33 will be described later with reference to FIGS. 2, 3, and 4.

The command determining unit 34 determines an estimated command as being an input command in a case where the estimated command satisfies a predetermined condition. The predetermined condition is not particularly limited. In this embodiment, a first condition that a command is an estimated command whose input probability has reached 100% and a second condition that, for example, a command is an estimated command after the lapse of a predetermined time (e.g., 30 frames) are adopted. The first condition and the second conditions are "OR conditions." That is, an estimated command is considered as satisfying the predetermined condition in a case where either the first condition or the second condition is satisfied.

The action executing unit 35 executes an action corresponding to an input command. Specifically, for example, while a game in which an enemy exists is being executed, the action executing unit 35 calculates damage to the enemy, etc. corresponding to the input command and displays an image having content reflecting the result of calculation.

Furthermore, a case where the information processing apparatus 10 in this embodiment is applied to a game will be described below in detail with reference to the drawings, starting from FIG. 2. In a situation where a command being entered by a player involves ambiguity, the information processing apparatus 10 in this embodiment continuously calculates the input probabilities, described earlier, for individual commands as probabilities for estimating the command being input. Then, the information processing apparatus 10 schedules processing for rendering a character motion and processing for executing a command in the game in accordance with changes in the input probabilities. The scheduling here refers to modifying or changing processing, including, for example, processing for omitting a part of motion rendering corresponding to a command, processing for starting rendering of another motion corresponding to another command from an intermediate point in accordance with changes in the input probabilities, processing for omitting motion rendering, immediately executing a command, and displaying the result, and processing for rendering a moving image related to another action from an intermediate point. In games involving such scheduling, the terms "command," "motion," and "action" have the following meanings. A command refers to a sequence of input events corresponding to a single function in a game. For example, in this embodiment, a command is represented by one or more sequential touch operations on the touchscreen 40, such as tapping the screen once in order to execute an "attack," tapping the screen twice to make a player character jump, pressing and holding on the screen to use a tool, or tapping an enemy character to select a target of an attack. A motion refers to a motion of a character displayed on the screen. A motion involves only a 2D/3D element that is rendered and does not involve actual hit-testing, etc. An action refers to processing that is executed as a result of executing a command and that affects a game, such as actual hit-testing. An action also involves processing for displaying the result of hit-testing on the screen.

Figure 2:
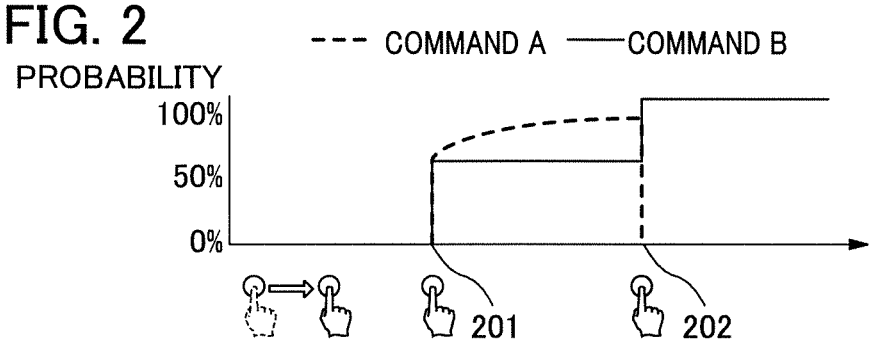
FIG. 2 is a chart showing an example of changes in input probabilities for an input event in the information processing apparatus in FIG. 1.
Figure 3:
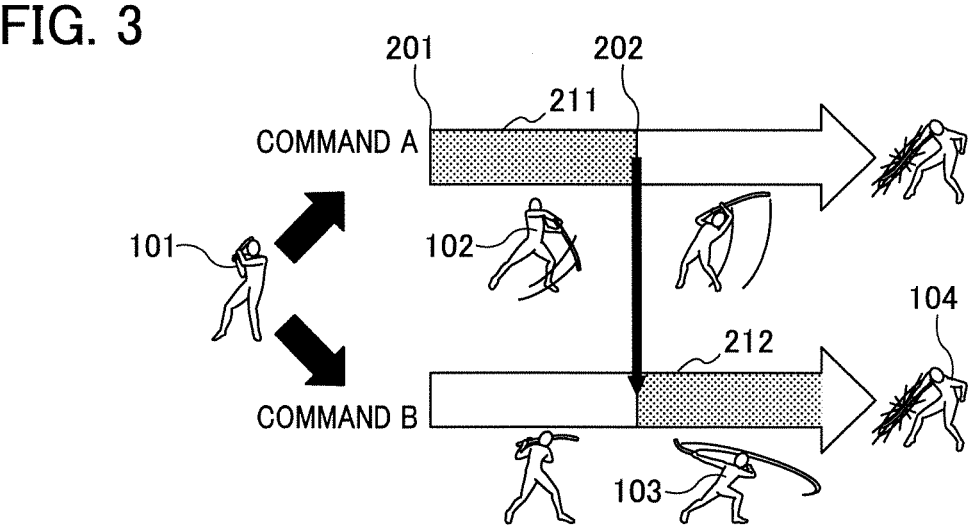
FIG. 3 is a chart showing an example of scheduling based on the example of changes in FIG. 2.
Figure 4:
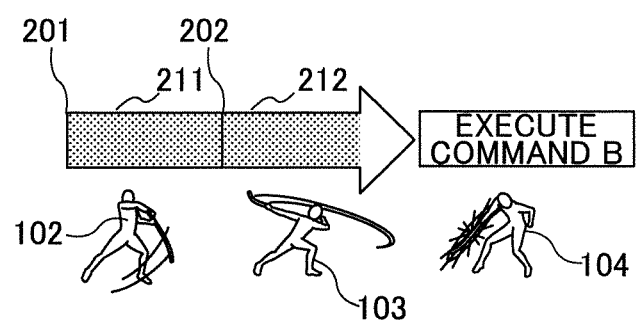
FIG. 4 is a chart showing an example of the result of the scheduling in FIG. 3.
Figure 5:
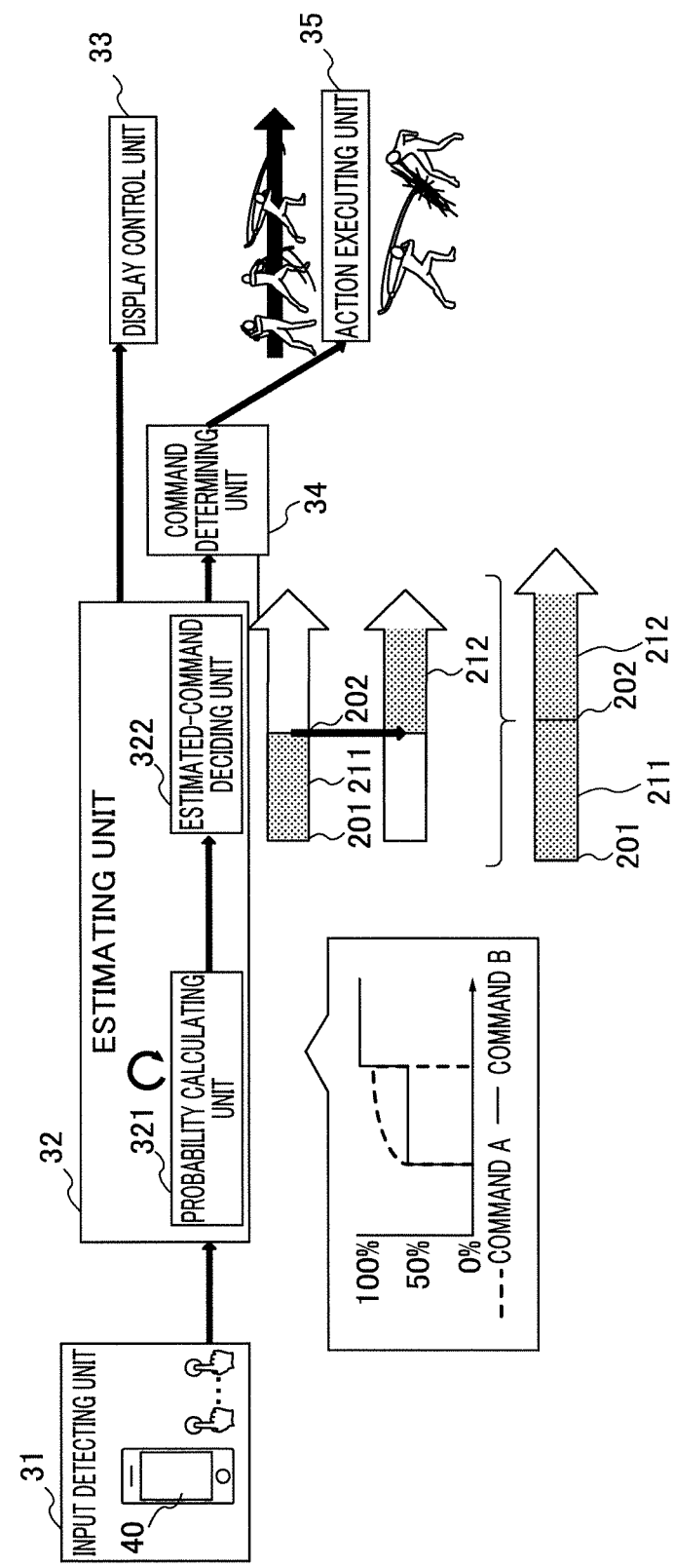
FIG. 5 is a diagram schematically showing the functions of the individual units of the information processing apparatus in FIG. 1 in accordance with the examples in FIGS. 2 to 4.

FIG. 2 is a chart showing an example of changes in input probabilities for an input event in the information processing apparatus 10 according to the embodiment of the present invention. FIG. 3 is a chart showing an example of scheduling based on the example of changes in FIG. 2. FIG. 4 is a chart showing an example of the result of the scheduling in FIG. 3. FIG. 5 is a diagram schematically showing the functions of the individual units of the information processing apparatus 10 in FIG. 1 in accordance with the examples in FIGS. 2 to 4.

In the examples in FIGS. 2 to 5, for convenience of explanation, it is assumed that only command A (a command invoked by tapping once, i.e., a single tap) and command B (a command invoked by tapping twice, i.e., a double tap) are defined. Furthermore, it is also assumed that 30 frames are used for drawing and execution for a single command. 30 frames corresponds to one second in a 30-FPS (Frames Per Second) game.

First, a player swipes the touchscreen 40 to move a character 101. At this time, the probabilities of occurrence of command A and command B both remain 0%.

Suppose that the player then performs a tap once on the touchscreen 40. At this time, the input detecting unit 31 in FIG. 5 detects the tap as an input event 201, as shown in FIG. 2. Then, the probability calculating unit 321 in FIG. 5 calculates the individual input probabilities of command A and command B (the probabilities that the individual commands A and B can be the input command). Here, command A is represented by a simpler operation than command B. Thus, at the timing when a tap has been performed once, the input probability of command A is calculated as being slightly higher than the input probability of command B, as shown in FIG. 2. Accordingly, the estimated-command deciding unit 322 in FIG. 5 decides command A, which has the highest input probability, as an estimated command. Then, the display control unit 33 in FIG. 5 starts drawing processing 211 for a motion corresponding to command A, as shown in FIGS. 3 and 4. That is, a motion display 102 is started as a character display.

Then, the probability calculating unit 321 continues to calculate the individual input probabilities of commands A and B, when needed, on the basis of a history of detection results in the input detecting unit 31. Specifically, after the input event 201 is detected, until a next input event 202, which will be described later, is detected, the history of detection results indicates that no input event occurred during a certain time after a tap was performed once (the input event 201). In this case, as the certain time during which no input event occurred becomes longer, the probability that the operation ends with that one tap increases. Thus, the input probability of command A gradually increases, as indicated by a dotted line in FIG. 2. On the other hand, the input probability of command B remains constant, as indicated by a solid line in FIG. 2. Accordingly, the estimated-command deciding unit 322 maintains the decision result indicating command A as the estimated command. Thus, the display control unit 33 continues the drawing processing 211 for the motion corresponding to command A, as shown in FIGS. 3 and 4. That is, the motion display 102 is continued as the character display.

Suppose, further, that the player then performs a second tap, for example, after 15 frames since the start of drawing. At this time, the input detecting unit 31 detects the tap as an input event 201, as shown in FIG. 2. In this case, the history of detection results indicates that two taps (the input events 201 and 202) were performed. Since only command A with one tap and command B with two taps are defined in this example, the probability calculating unit 321 calculates the input probability of command A as 0% and calculates the input probability of command B as 100%. That is, the highest input probability changes from the input probability of command A to the input probability of command B. Then, the display control unit 33 stops the drawing processing 211 for the motion corresponding to command A and starts drawing processing 212 for a motion corresponding to command B, as shown in FIGS. 3 and 4. That is, the character display changes from the motion display 102 to a motion display 103. Here, in this embodiment, the motion display 103 corresponding to command B is started from the 16th frame, with the first 15 frames skipped.

To put it more generally, a period (30 frames in this example) from detection of an input event (the input event 201 in this example) to the execution of an action is specified in advance. Furthermore, the first image (corresponding to the motion display 102 in this example) corresponding to command A and the second image (corresponding to the motion display 103 in this example) corresponding to command B are moving images having lengths equal to the period specified in advance (30 frames in this example). In the case where the estimated command changes from command A to command B at a certain timing in the period (the timing after drawing 15 frames), the display control unit 33 starts the display of the second image with the display start point of the second image set at the certain timing in the period (the timing after drawing 15 frames, so starting from the 16th frame).

However, this is only an example. For example, the 1st to 30th frames at the beginning of the second image (the motion for command B) may be drawn during the period of 15 frames by utilizing frame decimation rendering (fast-forward rendering), etc.

Upon the occurrence of the input event 202, the input probability of command B becomes 100%. Thus, the command determining unit 34 in FIG. 5 determines command B as being the input command.

After the motion display 103 for command B is drawn, until the 30th frame (after the motion drawing for 30 frames from the first input event 201 is performed), the action executing unit 35 in FIG. 5 executes processing for a predetermined action according to command B. For example, the calculation of damage to an enemy by the attack with command B is performed. Then, a character display 104 reflecting the result of damage calculation, etc. is performed as needed, as shown in FIGS. 3 and 4.

Here, by representing the history of detection results of input events detected by the input detecting unit 31 in the form of a matrix shown in FIGS. 6 and 7 (hereinafter referred to as a "touch event matrix"), it becomes possible to readily and reliably execute the calculation on the estimating unit 32.

Figure 6:
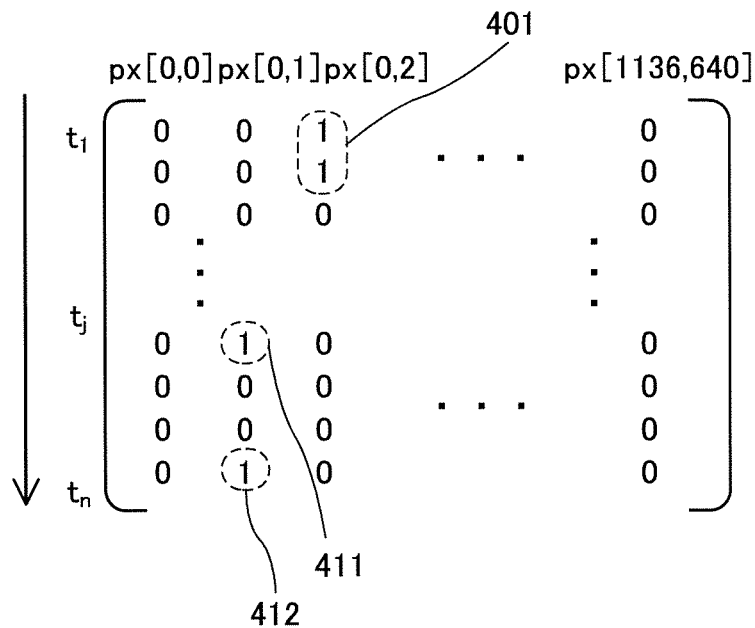
FIG. 6 is a chart showing an example of a touch event matrix used by the information processing apparatus in FIG. 1.

FIG. 6 is a chart showing an example of the touch event matrix. FIG. 7 is a chart showing another example of the touch event matrix. In this embodiment, the touch event matrices shown in FIGS. 6 and 7, shown as examples, are configured by recording on a memory, in sequential order of time, whether an input event by a user occurred at the individual pixels constituting the touchscreen 40.

Figure 7:
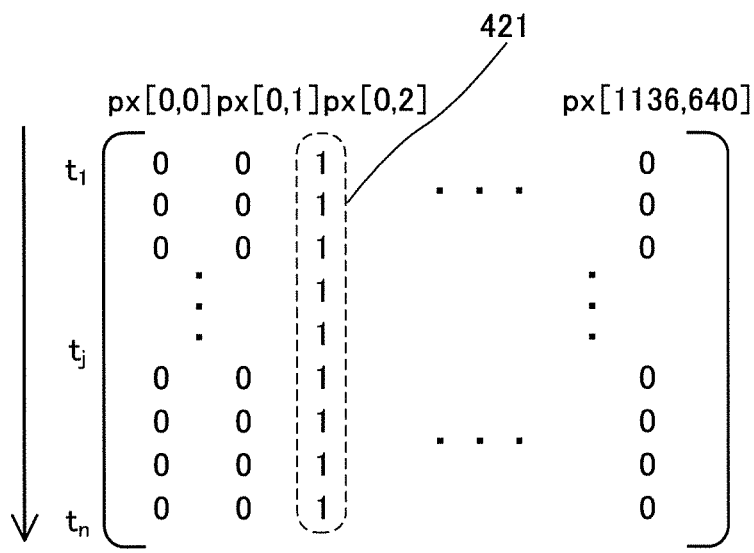
FIG. 7 is a chart showing another example of a touch event matrix used by the information processing apparatus in FIG. 1.

In the touch event matrices in the examples shown in FIGS. 6 and 7, detection units (individual pixels) of input events on the display medium are adopted as elements of columns (elements along the horizontal axis), and detection timings of input events are adopted as elements of rows (elements along the horizontal axis representing time). Specifically, px[x, y] representing each element of columns (each element along the horizontal axis) signifies the x-th pixel horizontally and the y-th pixel vertically when the top right of the touchscreen 40 is considered as the origin. For example, px[0, 0] signifies the uppermost and rightmost pixel, and px[1136, 640] signifies the lowermost and leftmost pixel. The elements of rows (elements along the vertical time axis) represent detection timings of input events in units of milliseconds or the number of frames. In a case where the information processing system is applied to a game, it is preferred to represent the elements of rows (elements along the vertical axis) in the number of frames. In this example, to each element (ti, px[x, y]) of the touch event matrix, "1" is stored when an input event occurred at the pixel px[x, y] at the detection timing ti, whereas "0" is stored when no input event occurred. The above method of storing values is only an example. For example, a method of storing real values, such as 0.5, may be adopted in order to deal with ambiguous input events or to directly handle capacitances on the touchscreen 40.

With the touch event matrix in FIG. 6, it is understood from a group of elements 401 for the pixel px[0, 2] that a tap event occurred but was not followed by another tap event during a continuous period. That is, the group of elements 401 indicates the detection of a single tap at the pixel px[0, 2]. On the other hand, it is understood from elements 411 and 412 for the pixel px[0, 1] that a touch event was followed by another touch event at the same (or nearby) pixel after a certain time interval. That is, the elements 411 and 412 indicate the detection of a double tap at the pixel px[0, 1].

Furthermore, with the touch event matrix in FIG. 7, it is understood from a group of elements 421 for the pixel px[0, 2] that a touch event occurred continuously for a long period at the same position. That is, the group of elements 421 indicates the detection of a touch operation in which something such as a finger was kept pressed at the position, i.e., the detection of what is called a press and hold.

The structure of the touch event matrix is not limited to the structures in FIGS. 6 and 7 and may be any structure satisfying the following. Specifically, any matrix constituted by using detection timings of input events as elements of one of rows and columns and using detection units of input events on the display medium as elements of the other of rows and columns, the matrix having detection results at the individual detection timings and for the individual detection units as individual element values, may be adopted as a touch event matrix.

Next, an overview of a method of calculating input probabilities for individual commands used in a game on the basis of a touch event matrix having the structure shown in FIG. 6 or 7 will be described. When n (n is an integer value greater than or equal to 1) commands exist in a game title, n functions (hereinafter referred to as "probability calculating functions) for calculating the input probabilities of the n individual commands are prepared. Specifically, a probability calculating function fi associated with an i-th command (i is an arbitrary integer value from 1 to n) can be defined as a function that takes a touch event matrix M as an argument and that returns a real value in a range of 0 to 1, as in equation (1):

$$fi(M, wi) \rightarrow [0 \ldots 1] \quad (1)$$

Here, wi signifies a weight coefficient associated with the i-th command. By setting such weight coefficients, it becomes possible to reflect differences between commands that are easy to enter and commands that are not easy to enter in the calculation of input probabilities. Specifically, in the example in FIG. 2, command A, which is simpler, is given a greater weight coefficient than command B, which is more complex. The detailed implementation of the probability calculating functions is not dictated here since it depends on the nature of the game.

The probability calculating unit 321 in FIG. 5 calculates the input probabilities of the n individual commands by using the touch event matrix M and the probability calculating functions fi in equation (1) above. The estimated-command deciding unit 322 decides a command having the highest input probability among the n commands as an estimated command and notifies the display control unit 33 to start rendering from a suitable frame number for the estimated command. Furthermore, the estimated-command deciding unit 322 notifies the command determining unit 34 of a specific command when the input probability of the specific command is calculated as 100% by the probability calculating unit 321.

The following describes the operation of the estimated-command deciding unit 322 in more detail. The estimated-command deciding unit 322 initializes a frame number counter (hereinafter called "FC"), which is an internal variable, to zero. When all the n input probabilities calculated by the probability calculating unit 321 are less than 100%, i.e., upon the occurrence of an input involving ambiguity, the estimated-command deciding unit 322 selects a command having the highest input probability (referred to as "command α") as an estimated command and notifies the display control unit 33 that a motion for command α is to be rendered starting from the frame corresponding to the value indicated by FC. If the command having the highest input probability among the input probabilities calculated by the probability calculating unit 321 changes while the motion for command α is being rendered, the estimated-command deciding unit 322 selects the command having the highest input probability after the change (referred to as "command β") as an estimated command. Then, the estimated-command deciding unit 322 notifies the display control unit 33 to suspend the current motion rendering for command α and also notifies the display control unit 33 to add the number of frames rendered to the value of FC and to then start rendering a motion for command β from the frame corresponding to the value indicated by FC.

The display control unit 33 renders a character motion according to the above notification from the estimated-command deciding unit 322. The display control unit 33 can be implemented as an extension of motion rendering provided by existing game software. In a case where the states of motions are identified by using frame numbers, as in this example, application to either 2D or 3D games is possible.

The command determining unit 34 determines the command according to the notification from the estimated-command deciding unit 322 as being the input command and notifies the action executing unit 35 to execute an action corresponding to the input command after rendering (motion display for a character) corresponding to the input command is finished.

The action executing unit 35 executes a predetermined action according to the input command in the notification from the command determining unit 34. For example, the action executing unit 35 executes processing that affects the game, such as actual hit-testing. Furthermore, the action executing unit 35 executes control for displaying the results of hit-testing on the screen. The action executing unit 35 can be realized by reusing and implementing action execution functions of existing game software.

Figure 8:
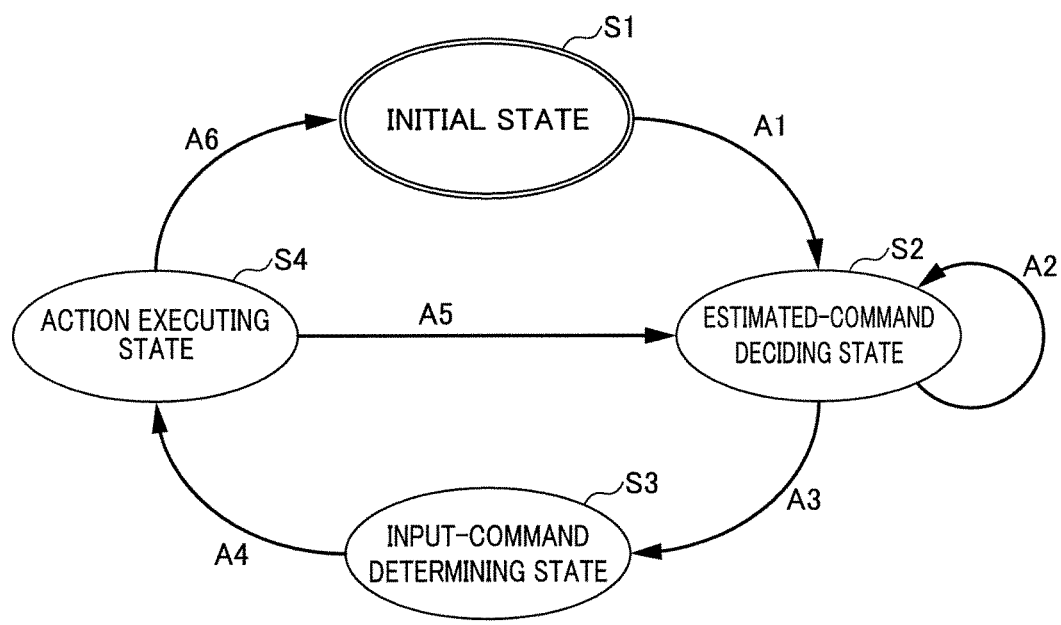
FIG. 8 is a state transition diagram showing an example of state transitions in the information processing apparatus in FIG. 1.
Figure 9:
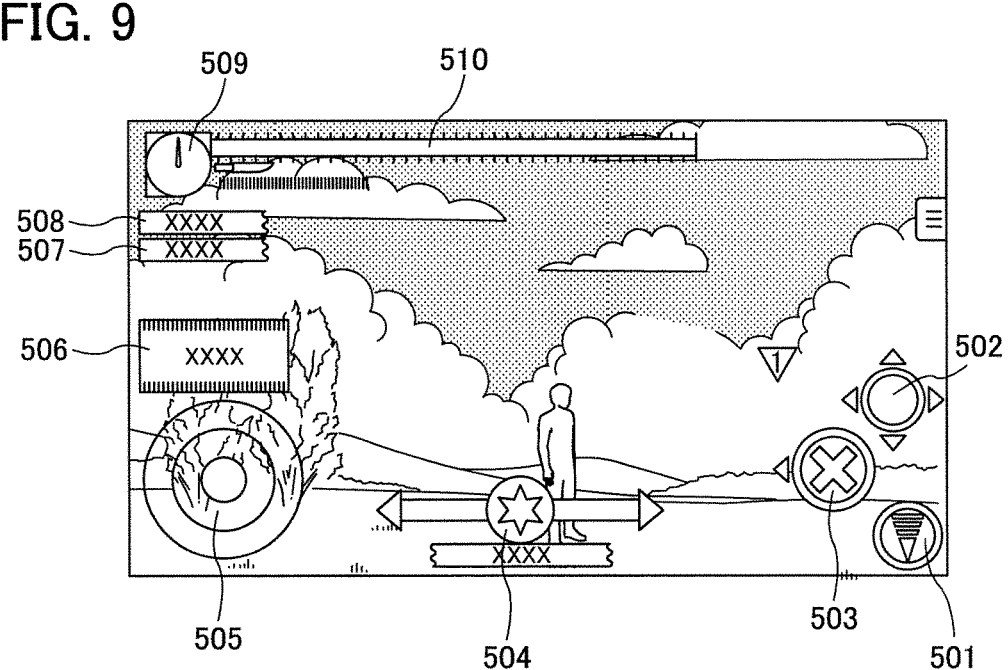
FIG. 9 is an illustration of a fixed button-based user interface.
Figure 10:
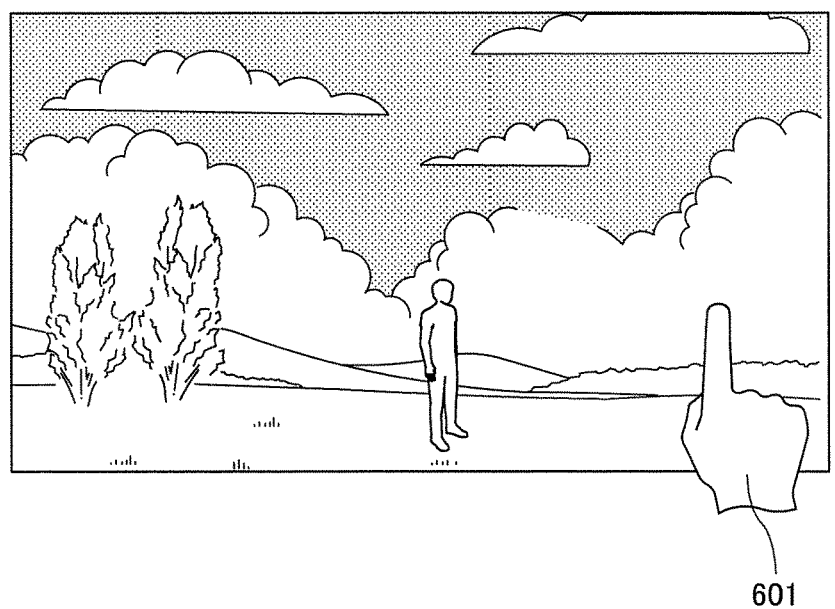
FIG. 10 is an illustration of a position-independent user interface.

FIG. 8 is a state transition diagram showing an example of state transitions in an information processing apparatus 10 according to the embodiment described above. A procedure for executing context-aware scheduling of character actions by the information processing apparatus 10 will be described with reference to FIG. 8. Upon the detection of an input event, the information processing apparatus 10 executes processing in the form of a loop in order to continuously calculate the input probabilities of the individual commands. In FIG. 8, which shows a state transition model in the loop, each state is represented by an ellipse and is distinguished from other states by a sign including "S" and attached to the ellipse. A state transition from one state to another is executed when a predetermined condition (hereinafter referred to as a "state transition condition") is satisfied. In FIG. 8, such state transition conditions are each represented by a sign including "A" and attached to an arrow representing a transition from one state to another.

As shown in FIG. 8, in this embodiment, the basic state is an initial state S1. It is assumed that a transition from another state (not shown) to the initial state S1 occurs when a user performs a predetermined operation (e.g., an operation for starting the game). In the initial state S1, the information processing apparatus 10 sets the input probabilities of all the commands, stored in internal variables of the input detecting unit 31, to zero. The information processing apparatus 10 also sets FC, which is an internal variable, to zero.

In the initial state S1, when the input detecting unit 31 detects an input event (e.g., a tap by a player), a state transition condition A1 is satisfied. Then, the state transitions to an estimated-command deciding state S2.

In the estimated-command deciding state S2, the estimating unit 32 calculates the input probabilities of all the commands by using a touch event matrix and decides a command having the highest input probability as an estimated command. The display control unit 33 starts drawing a motion for the estimated command.

In the estimated-command deciding state S2, unless the input probability reaches 100%, it is considered that a state transition condition A2 is satisfied, and the state returns to the estimated-command deciding state S2. That is, the estimated-command deciding state S2 is maintained. In a case where the input probability of an estimated command reaches 100% while the estimated-command deciding state S2 is being maintained, a state transition condition A3 is satisfied. Then, the state transitions to an input-command determining state S3.

Upon the transition to the input-command determining state S3, the command determining unit 34 determines the estimated command whose input probability has reached 100% as being the input command. Then, a state transition condition A4 is satisfied, and the state transitions to an action executing state S4.

Upon the transition to the action executing state S4, the action executing unit 35 executes an action. In a case where an input event is detected after the execution of the action, a state transition condition A5 is satisfied, and the state transitions to the estimated-command deciding state S2. On the other hand, in a case where no input event is detected after the execution of the action, a state transition condition A6 is satisfied, and the state transitions to the initial state S1.

As described above, the information processing apparatus 10 in this embodiment can realize a highly responsive position-independent user interface for the touchscreen 40 through context-aware character action scheduling. That is, the information processing apparatus 10 can drastically improve responsiveness while supporting a large number of commands in a position-independent user interface that is operated by touching arbitrary positions on the touchscreen 40. Furthermore, the information processing apparatus 10 in this embodiment makes it possible to continuously execute probability calculations for estimating a user's intent based on a sequence of input events obtained via the touchscreen 40 and to schedule the display of a character motion and the execution of an action (hit-testing for an attack, consumption of an item, etc.) in real time in accordance with changes in the probabilities. With this scheduling by the information processing apparatus 10, ambiguity about a command is excluded at extremely high speed as the command is entered, while immediately rendering a character motion during the command input. Accordingly, it becomes possible to simultaneously realize high responsiveness and accurate identification of a large variety of commands.

That is, the information processing apparatus 10 in this embodiment makes it possible to enter a large variety of commands via a position-independent user interface without compromising responsiveness as perceived by a user. Conventional position-independent user interfaces allow defining only limited numbers of commands since they just accept commands that require unsuitably long times to enter for games, as in the case of gesture input, or commands that are represented by very simple input events. In contrast, with the information processing apparatus 10 in this embodiment, even if a number of commands corresponding to a factor of a few to a few tens are defined, it is possible to decide an estimated command upon the start of input and to start displaying a character image (motion) corresponding to the estimated command. Accordingly, it will be acknowledged by players that high responsiveness is realized.

Furthermore, the information processing apparatus 10 in this embodiment also has the following other advantages.

The information processing apparatus 10 in this embodiment has an advantage in that it can realize a resolution-independent user interface. Specifically, since the information processing apparatus 10 in this embodiment does not require using buttons displayed on the screen, it can realize a user interface that does not depend on the resolution of the touchscreen 40. Accordingly, it becomes possible to provide users with the same level of ease of operation even in situations where the resolutions vary among different types of smartphones.

The information processing apparatus 10 in this embodiment has an advantage in that it allows reuse of existing assets. Specifically, the information processing apparatus 10 in this embodiment allows using arbitrary assets (still images and 3D objects used in games) as long as the states of a motion can be identified by using frame numbers. Thus, the information processing apparatus 10 in this embodiment can be applied to either 2D or 3D games and allows reuse of existing game assets without making modifications.

The information processing apparatus 10 in this embodiment has an advantage in that it is applicable to a large variety of genres. Specifically, the scheduling realized by the information processing apparatus 10 in this embodiment does not depend on any specific game genre. Therefore, the information processing apparatus 10 in this embodiment is applicable to a wide variety of games in which users enter commands in real time, such as action games, real-time RPGs, and real-time simulation games. Moreover, the applications of the information processing apparatus 10 in this embodiment need not be particularly limited to games, and it is also applicable when executing an algorithm involving a plurality of actions corresponding to a plurality of commands.

It is to be noted that the present invention is not limited to the above-described embodiment and that modifications, improvements, etc. within a scope in which it is possible to achieve the object of the present invention are encompassed in the present invention.

For example, although the method in which the input probabilities of individual commands are obtained is adopted as the method of calculating an estimated command in the above-described embodiment, without particular limitation to this method, a method based on an arbitrary algorithm, such as a method in which candidates of an estimated command are progressively narrowed down through branch processing, etc., may be adopted.

In other words, an information program that is executed by a computer to which the present invention is applied may be embodied in various forms having the following features, including the information processing program that is executed by the information processing apparatus 10 in the above-described embodiment in FIG. 1.

Specifically, an information processing program to which the present invention is applied is an information processing program for causing a computer (e.g., the information processing apparatus 10 in FIG. 1) that executes a game involving a plurality of kinds of actions corresponding to predetermined commands represented by predetermined sequences of input events to execute control processing including: an input detecting step (e.g., the input detecting unit 31 in FIG. 1, which executes this step) of detecting an input event based on an operation of bringing something into contact with or in proximity to a display medium; an estimating step (e.g., the estimating unit 32 in FIG. 1, which executes this step) of deciding, as an estimated command, a command that is estimated as being an input command among the plurality of kinds of commands on the basis of a history of detection results in the input detecting step; a display control step (e.g., the display control unit 33 in FIG. 1, which executes this step) of executing control for displaying an image related to the estimated command on the display medium; a command determining step (e.g., the command determining unit 34 in FIG. 1, which executes this step) of determining the estimated command as being the input command in a case where the estimated command satisfies a predetermined condition; and an action executing step (e.g., the action executing unit 35 in FIG. 1, which executes this step) of executing the action corresponding to the determined input command.

Accordingly, the information processing program according to the present invention makes it possible for a computer to support a large variety of commands with a position-independent user interface and to realize high responsiveness to commands as perceived by a user.

Furthermore, for example, although drawing of a motion for a command having the highest value among the calculated input probabilities is started in the above-described embodiment, without particular limitation to this example, in an alternative embodiment, the next execution of probability calculations may be awaited without drawing a motion when the input probabilities of all the commands are less than a threshold (e.g., 30%). In this case, with the information processing apparatus 10, it becomes possible to more reliably estimate an input command matching a user's intent among a large variety of commands, while realizing real-time responsiveness to commands.

The series of processing steps described above may be executed either by hardware or by software. In other words, the functional configuration shown in FIG. 1 is only an example, and there is no particular limitation to this example. That is, it suffices if an information processing program provides functions that enable the execution of the above-described series of processing steps as a whole, and the configuration of functional blocks for implementing the functions is not particularly limited to the example in FIG. 1. Furthermore, each functional block may be implemented by hardware alone, by software alone, or by a combination of hardware and software.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a user, a recording medium that is provided to a user as installed in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

EXPLANATION OF REFERENCE NUMERALS

10 Information processing apparatus
30 Control unit
31 Input detecting unit
32 Estimating unit
33 Display control unit
34 Command determining unit
35 Action executing unit
40 Touchscreen
321 Probability calculating unit
322 Estimated-command deciding unit

The invention claimed is:

1. A non-transitory computer readable medium storing an information processing program for causing a computer that executes a game involving a plurality of kinds of actions corresponding to predetermined commands represented by predetermined sequences of input events to execute control processing comprising:
   an input detecting step of detecting an input event based on an operation of bringing something into contact with or in proximity to a display medium;
   an estimating step of deciding, as an estimated command, a command that is estimated as being an input command among the plurality of kinds of commands on the basis of a history of detection results in the input detecting step;
   a display control step of executing control for displaying an image related to the estimated command on the display medium;
   a command determining step of determining the estimated command as being the input command in a case where the estimated command satisfies a predetermined condition; and
   an action executing step of executing the action corresponding to the determined input command.

2. The non-transitory computer readable medium according to claim 1, wherein the estimating step includes:

a probability calculating step of calculating individual input probabilities of the plurality of kinds of commands on the basis of the history of the input events; and an estimated-command deciding step of deciding, as the estimated command, a command having the highest input probability.

3. The non-transitory computer readable medium according to claim 1, wherein the display control step includes a step of executing control for:

displaying a first image corresponding to a first estimated command on the display medium in a case where the first estimated command is decided in the estimating step; and stopping the display of the first image and displaying a second image corresponding to a second estimated command on the display medium in a case where the second estimated command is then decided in the estimating step before the input command is determined in the command determining step.

4. The non-transitory computer readable medium according to claim 3, wherein a period from the detection of the input event to the execution of the action is specified in advance, wherein the first image and the second image are moving images having lengths equal to the period, and wherein, in a case where switching from the first estimated command to the second estimated command occurs at a certain timing during the period, the display control step includes a step of executing control for starting display of the second image with a display start point of the second image set at the certain timing during the period.

5. The non-transitory computer readable medium according to claim 1, wherein the input detecting step includes a step of generating a matrix constituted by using detection timings of input events as elements of one of rows and columns and using detection units of input events on the display medium as elements of the other of rows and columns, the matrix having detection results at the individual detection timings and for the individual detection units as individual element values, and wherein the estimating step includes a step of deciding the estimated command by using the matrix.

6. An information processing method that is executed by an information processing apparatus and that involves a plurality of kinds of actions corresponding to predetermined commands represented by predetermined sequences of input events, the information processing method comprising:

an input detecting step of detecting an input event based on an operation of bringing something into contact with or in proximity to a display medium;

an estimating step of deciding, as an estimated command, a command that is estimated as being an input command among the plurality of kinds of commands on the basis of a history of detection results in the input detecting step;

a display control step of executing control for displaying an image related to the estimated command on the display medium;

a command determining step of determining the estimated command as being the input command in a case where the estimated command satisfies a predetermined condition; and an action executing step of executing the action corresponding to the determined input command.

* * * * *